(12) United States Patent
Baek et al.

(10) Patent No.: US 8,159,946 B2
(45) Date of Patent: Apr. 17, 2012

(54) RESOURCE MANAGEMENT METHOD IN WIRELESS COMMUNICATION SYSTEM

(75) Inventors: Joo-Young Baek, Pohang (KR); Min-Kon Kwak, Seongnam (KR); Dong-Hee Kwon, Seongnam (KR); Young Joo Suh, Pohang (KR)

(73) Assignees: Postech Academy-Industry Foundation, Kyungsangbuk-do (KR); Posco, Gyeongsangbuk-do (KR)

( * ) Notice: Subject to any disclaimer, the term of this patent is extended or adjusted under 35 U.S.C. 154(b) by 781 days.

(21) Appl. No.: 12/183,320

(22) Filed: Jul. 31, 2008

(65) Prior Publication Data

US 2009/0034464 A1    Feb. 5, 2009

(30) Foreign Application Priority Data

Aug. 2, 2007 (KR) .................. 10-2007-0077812

(51) Int. Cl.
*G01R 31/08* (2006.01)
(52) U.S. Cl. ...................................... 370/232
(58) Field of Classification Search .......... 370/229–234, 370/328, 391, 395.21, 465, 468; 709/226, 709/229; 379/114.01, 114.06, 114.07
See application file for complete search history.

(56) References Cited

U.S. PATENT DOCUMENTS

| | | | |
|---|---|---|---|
| 2007/0206545 A1* | 9/2007 | Lee et al. | 370/338 |
| 2007/0211746 A1* | 9/2007 | Oshikiri et al. | 370/437 |
| 2008/0279139 A1* | 11/2008 | Beziot et al. | 370/329 |
| 2011/0066706 A1* | 3/2011 | Ostrover et al. | 709/219 |

* cited by examiner

*Primary Examiner* — Kwang B Yao
*Assistant Examiner* — Tung Q Tran
(74) *Attorney, Agent, or Firm* — Perman & Green, LLP

(57) ABSTRACT

Provided is a resource management method in a communication system, and more particularly, a resource management method based on priority in a wireless communication system. The resource management method in a wireless management network includes: setting a priority factor value with regard to a link flow for which link establishment is requested; and if a capacity required by the flow for which link establishment is requested exceeds a remaining capacity of a base station, increasing the remaining capacity of the base station by sequentially reducing a minimum reserved rate (MRR) value of flows that receive a service at a lower priority than the flow for which link establishment is requested to a maximum sustained rate (MSR) value, until the remaining capacity required by the flow for which link establishment is requested is generated.

10 Claims, 6 Drawing Sheets

FIG. 6

```
- For each flow has below characteristics
    ◊ Priority factor (PF) value depending on the class
    ◊ MSR : Maximum Sustained Rate of flow i
    ◊ MRR: Minimum Reserved Rate of flow i
- The remain capacity, C(t) = $m_k$* $c_k$* subcarriers (t is current frame, k is the
    robust  modulation & coding)
- Current  service flows : j ∈ Ns
- When the SS requests DSA -REQ to initiate a new flow (i) to BS, If (MRR ≤ C(t))
    Accept the service initiation of flow i
Else
    For same class,
        Search the flows with lowest PF value, and then insert the flow into the
        Victim Set (VS)
            For j ⊂ VS.
                Update the MSR as the service bandwidth to flow j,
                C(t) += ($MRR_j$ - $MSR_j$)
                Check the available bandwidth to flow i until ($MRR_i$ ≤ C(t))
        If not available bandwidth to flow i,
            then observe the lower class and reset the VS
    For below class,
        Insert the flows of that class into the Victim Set (VS)
            For j ∈ VS.
                Update the MSR as the service bandwidth to flow j,
                C(t) += ($MRR_j$ - $MSR_j$)
                Check the available bandwidth to flow i until ($MRR_i$ ≤ C(t))
        If not available bandwidth to flow i, then observe the lower class.
If there is impossible to accept the service even though degrading exsiting flows'
```

RESOURCE MANAGEMENT METHOD IN WIRELESS COMMUNICATION SYSTEM

CROSS-REFERENCE TO RELATED PATENT APPLICATION

This application claims priority to and the benefit of Korean Patent Application No. 10-2007-0077812, filed on Aug. 2, 2007, in the Korean Intellectual Property Office, the disclosure of which is incorporated herein in its entirety by reference.

BACKGROUND

1. Field

The disclosed embodiments relate to a resource management method in a communication system, and more particularly, to a resource management method based on priority in a wireless communication system.

2. Description of the Related Art

A technology of the 802.16/WiBro system, which is a wireless communication system, has been standardized by the IEEE/TTA working group, and has been commercialized in Korea as WiBro.

Radio resources are limited in an 802.16/WiBro environment. Admission control is necessary for an efficient use of limited resources. However, the current standard has not suggested how to provide the admission control. When a third generation method is applied to perform the admission control, it is difficult to reflect intrinsic characteristics of the 802.16/WiBro system.

SUMMARY

The disclosed embodiments provide a resource management method in a wireless communication system that provides link flows with priority factors and efficiently manages limited resources based on priority in a base station.

The disclosed embodiments also provide a computer readable recording medium storing a program for executing the resource management method in a wireless communication system that provides link flows with priority factors and efficiently manages limited resources based on priority in a base station.

According to an aspect of the disclosed embodiments, there is provided a resource management method in a wireless management network, the method comprising: setting a priority factor value with regard to a link flow for which link establishment is requested; and if a capacity required by the flow for which link establishment is requested exceeds a remaining capacity of a base station, increasing the remaining capacity of the base station by sequentially reducing a minimum reserved rate (MRR) value of flows that receive a service at a lower priority than the flow for which link establishment is requested to a maximum sustained rate (MSR) value, until the remaining capacity required by the flow for which link establishment is requested is generated.

The priority factor value may be determined according to a class to which a corresponding flow belongs.

The priority factor value may be determined according to classes, and a plurality of priorities are allocated to the same class.

The priority factor value may be determined in an order of an unsolicited grant service (UGS) class, an enhanced-real-time polling service (ertPS) class, a real-time polling service (rtPS) class, a non-real-time polling service (nrtPS) class, and a best effort service (BE) class.

The priority with regard to the flow for which link establishment is requested may be initially determined in an order of the highest priority in a class to which the flow belongs.

The method may further comprise: if the flow for which link establishment is requested is successfully initialized, changing the priority of the flows that have been successfully initialized to an initially set priority of a corresponding class.

The increasing of the remaining capacity may comprise: performing a first operation of sequentially reducing an MRR value of flows that receive a service at a lower priority than the flow for which link establishment is requested to an MSR value in the class to which the flow for which link establishment is requested belongs, until the remaining capacity is generated so as to admit the flow for which link establishment is requested.

The increasing of the remaining quantity may comprise: if the class to which requested link establishment belongs is the UGS class, skipping the first operation and performing a second operation of sequentially reducing an MRR value of flows that receive a service at a lower priority than the flow for which link establishment is requested to an MSR value in a class other than the UGS class, until the remaining capacity is generated so as to admit the flow for which link establishment is requested.

The increasing of the remaining capacity may comprise: if capacity required by the flow for which link establishment is requested exceeds the remaining capacity after performing the first operation, performing the second operation of sequentially reducing an MRR value of flows that receive a service at a lower priority than the flow for which link establishment is requested to an MSR value irrespective of a class, until the remaining capacity is generated so as to admit the flow for which link establishment is requested.

The method may further comprise: if the capacity required by the flow for which link establishment is requested exceeds the remaining capacity after performing the second operation, rejecting an admission of a service with regard to a corresponding flow.

The increasing of the remaining capacity may further comprise: changing the priority of the flows, the MRR value of which is reduced to the MSR value, to the highest priority of a class to which a corresponding flow belongs.

According to another aspect of the disclosed embodiments, there is provided a computer readable recording medium having recorded thereon a program for executing the resource management method in a wireless management network.

BRIEF DESCRIPTION OF THE DRAWINGS

The above and other features and advantages of the disclosed embodiments will become more apparent by describing in detail exemplary embodiments thereof with reference to the attached drawings in which:

FIG. 6 illustrates a pseudo code used to perform a resource management method in a wireless communication system according to an embodiment.

DETAILED DESCRIPTION OF THE DRAWINGS

The attached drawings for illustrating exemplary embodiments are referred to in order to gain a sufficient understanding of the disclosed embodiments, the merits thereof, and the objectives accomplished by the implementation of the disclosed embodiments.

Figure 1:
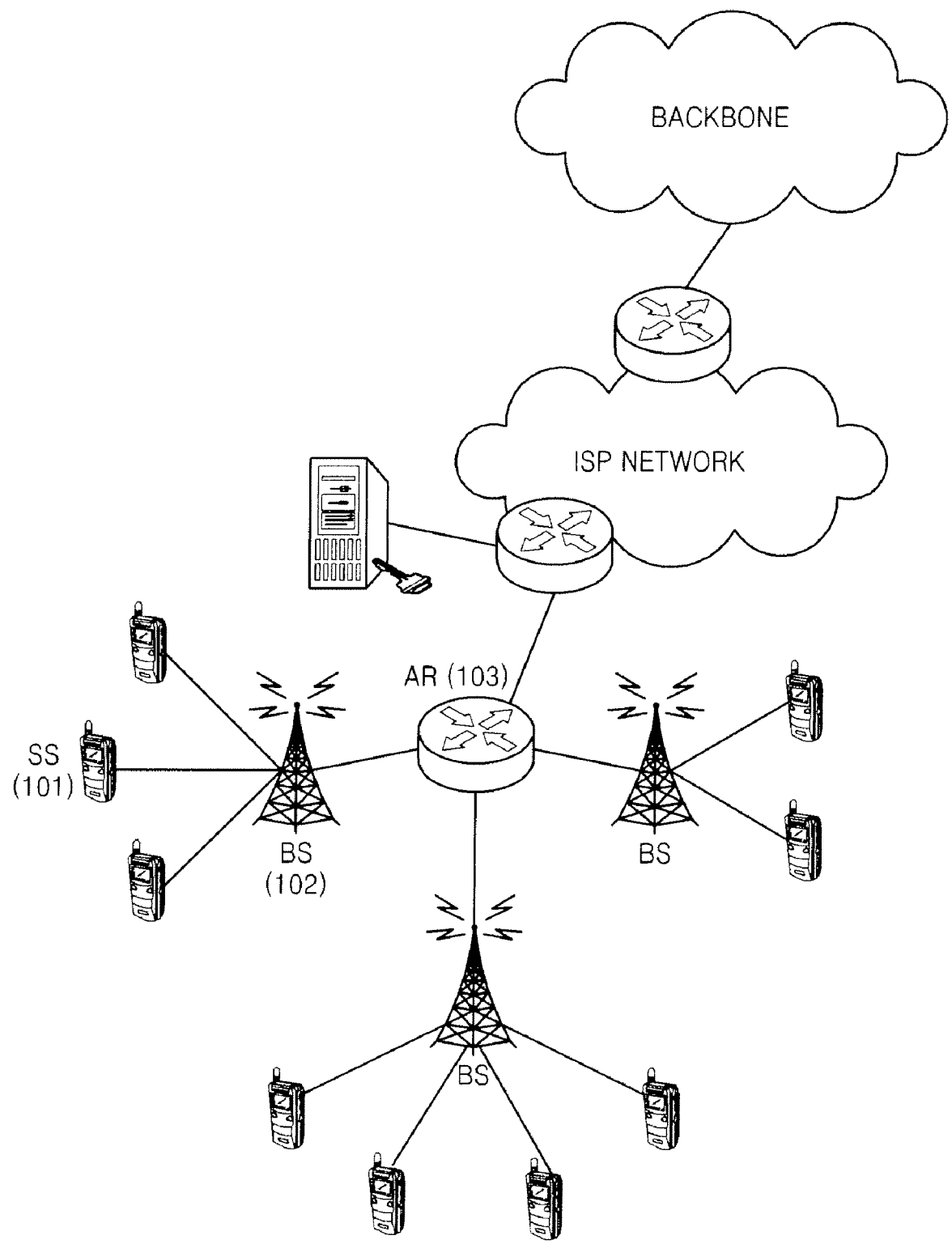
FIG. 1 illustrates the structure of an IEEE 802.16/WiBro network to which the disclosed embodiments are applied.

FIG. 1 illustrates the structure of an IEEE 802.16/WiBro network to which the disclosed embodiments are applied. Referring to FIG. 1, the IEEE 802.16/WiBro network comprises a subscriber station (SS) 101 that is a user terminal supporting an IEEE 802.16 protocol, a base station (BS) 102 that controls and manages a connection with the SS 101, and an access router (AR) 103 that transmits traffic received through the BS 102 to an Internet backbone network.

The IEEE 802.16/WiBro network basically provides a variety of quality of services (QoS). A variety of QoS parameters, such as bandwidth, change according to services provided by an application layer of the SS 101. In the IEEE 802.16/WiBro network, the characteristics of a physical medium, such as a data transmission rate, may rapidly change according to the characteristics and environment of a wireless medium, unlike in a wired network.

In the IEEE 802.16/WiBro network, the SS 101 defines a service class in order to guarantee the QoS. In more detail, the SS 101 defines the service class, such as an unsolicited grant service (UGS) class, an enhanced-real-time polling service (ertPS) class, a real-time polling service (rtPS) class, a non-real-time polling service (nrtPS) class, and a best effort service (BE) class, and defines scheduling according to the service class.

The UGS class provides a real-time data transmission service having a fixed size and a periodic interval. The UGS class supports a real-time uplink service that periodically transmits data having a fixed size, such as T1/E1, and voice over Internet protocol (VoIP) traffic having no silence suppression.

The rtPS class provides real-time bandwidth request and polling, and variable data scheduling and includes a video call, a video game, video on demand (VOD), etc. The rtPS class supports a real-time uplink service that periodically transmits data having a variable size, such as MPEG video traffic. RtPS scheduling must satisfy the characteristics of real-time traffic, and support a method of notifying the BS 102 of a bandwidth required by the SS 101. In order to satisfy the above requirements, the BS 102 performs periodic polling with regard to a specific SS. The specific SS that receives the polling requests a bandwidth according to an amount required by the specific SS. Hence, although data transmission efficiency between the SS 101 and the BS 102 is optimized, since the bandwidth is expressly requested, the rtPS class has an overhead compared to the UGS class.

The ertPS class does not provide the real-time bandwidth request and polling that is provided by the rtPS class between the SS 101 and the BS 102 but notifies the BS 102 of a change in the bandwidth when the SS 101 requires the change in the bandwidth and accordingly manages a bandwidth QoS.

The nrtPS class provides a service sensitive to a minimum data processing rate compensation and packet loss and includes large volume FTP, multimedia email, etc. The nrtPS class supports a data stream having a variable size that is insensitive to latency, such as FTP. A scheduling mechanism of the nrtPS class supports bandwidth allocation by polling and by competition.

The BE class provides a fair scheduling and efficient data retransmission service and includes a web browsing email, a short message transmission service, low speed file transmission, etc. The BE class supports a method of piggybacking a bandwidth request for periodic polling and data transmission, and a method of requesting bandwidth by competition.

Figure 2:
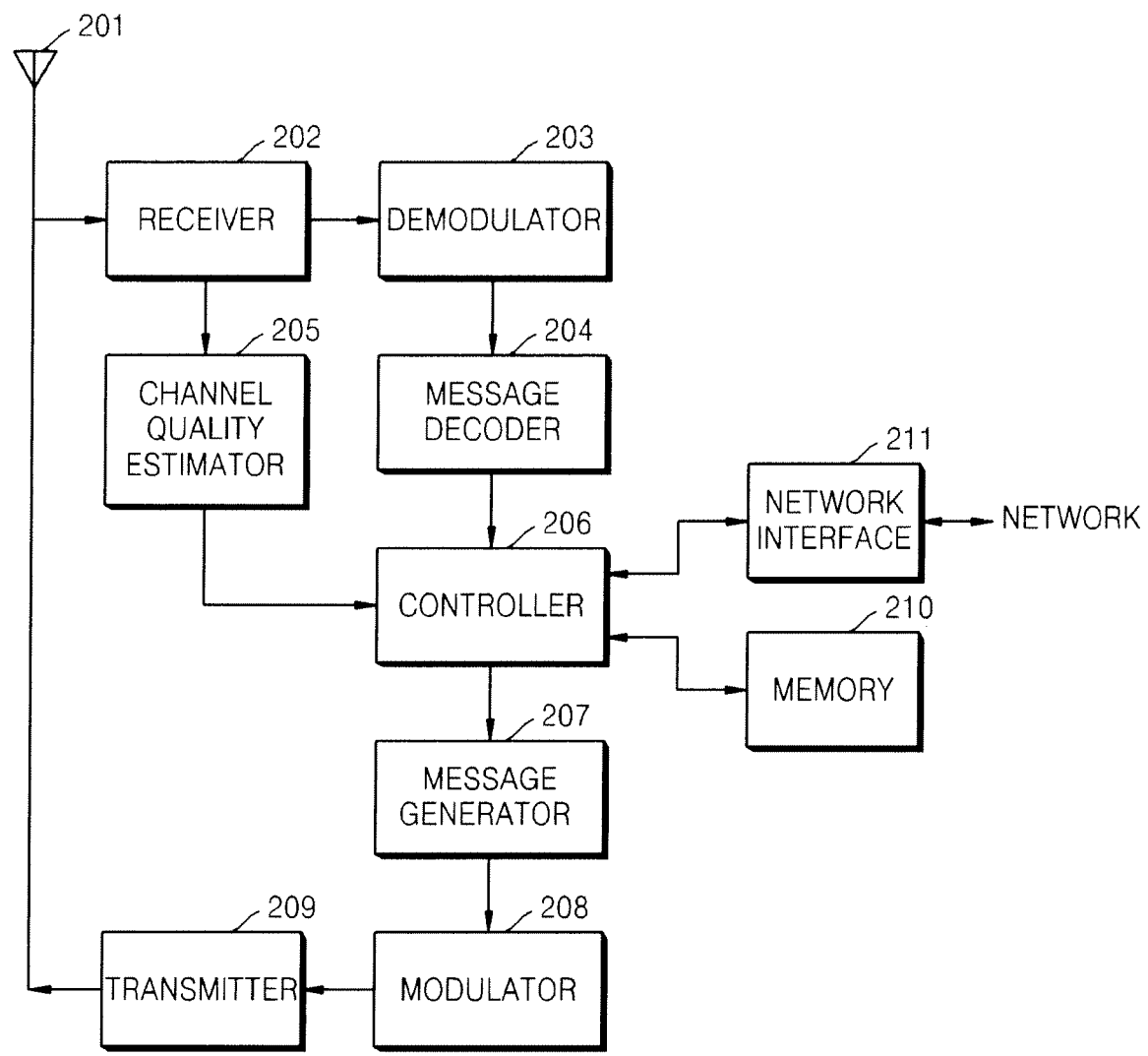
FIG. 2 is a block diagram of a base station device shown in FIG. 1.

FIG. 2 is a block diagram of a base station device of a wireless communication system to which the disclosed embodiments are applied. Referring to FIG. 2, the base station device comprises an antenna 201, a receiver 202, a demodulator 203, a message decoder 204, a channel quality estimator 205, a controller 206, a message generator 207, a modulator 208, a transmitter 209, a memory 210, and a network interface 211.

The antenna 201, although not shown, includes a transmission antenna and a reception antenna.

The antenna 201 receives signals from a user terminal over a network and transmits the signals to the receiver 202.

The receiver 202 performs signal processing based on a wireless communication system standard. To be more specific, the receiver 202 performs various kinds of signal processing including conversion and amplification of a wireless frequency and base band of a signal, conversion and filtering of an analog/digital signal, etc. A variety of signal processing procedures performed by receivers are well known to those of ordinary skill in the art.

The channel quality estimator 205 determines a channel quality and estimates a data rate that can be supported according to the channel quality.

The demodulator 203 demodulates the signal received by the receiver 202. The demodulator 203 performs equalization, de-interleaving, decoding, and a variety of functions required by a standard of the received signal.

The message decoder 204 receives the demodulated data and extracts messages transmitted from a user terminal in each forward or backward link. The message decoder 204 decodes a variety of messages used to set up, maintain and release a data session with regard to the wireless communication system. The messages include channel messages including a request, transmission, admission, etc. of establishment of a link flow. These messages are transmitted to the controller 206.

The signals are transmitted via the antenna 201. The transmitter 209 processes the signals based on the wireless communication system standard. The transmitter 209 comprises an amplifier, a digital/analog converter, a wireless frequency converter, etc. The modulator 208 modulates data and transmits the modulated data to the transmitter 209. The modulator 208 may comprise an encoder, an interleaver, a spreader, and may be in the form of various types of modulators.

The message generator 207 prepares various types of messages. For example, the message generator 207 generates a request message for requesting access to a network interface and an admission message for admitting the request message from the user terminal.

The network interface 211 performs a transmission/reception interface with devices connected to a network. The memory 210 stores various pieces of information used to support various types of communication services that are provided in the base station device. In particular, the memory 210 stores information on the class and priority of link flows being served, and stores information on a periodically calculated remaining capacity of the base station device.

The controller 206 generally controls a communication process in the base station device. In more detail, the controller 206 controls the wireless communication system to perform a resource management method shown in FIGS. 3 through 5.

Figure 3:
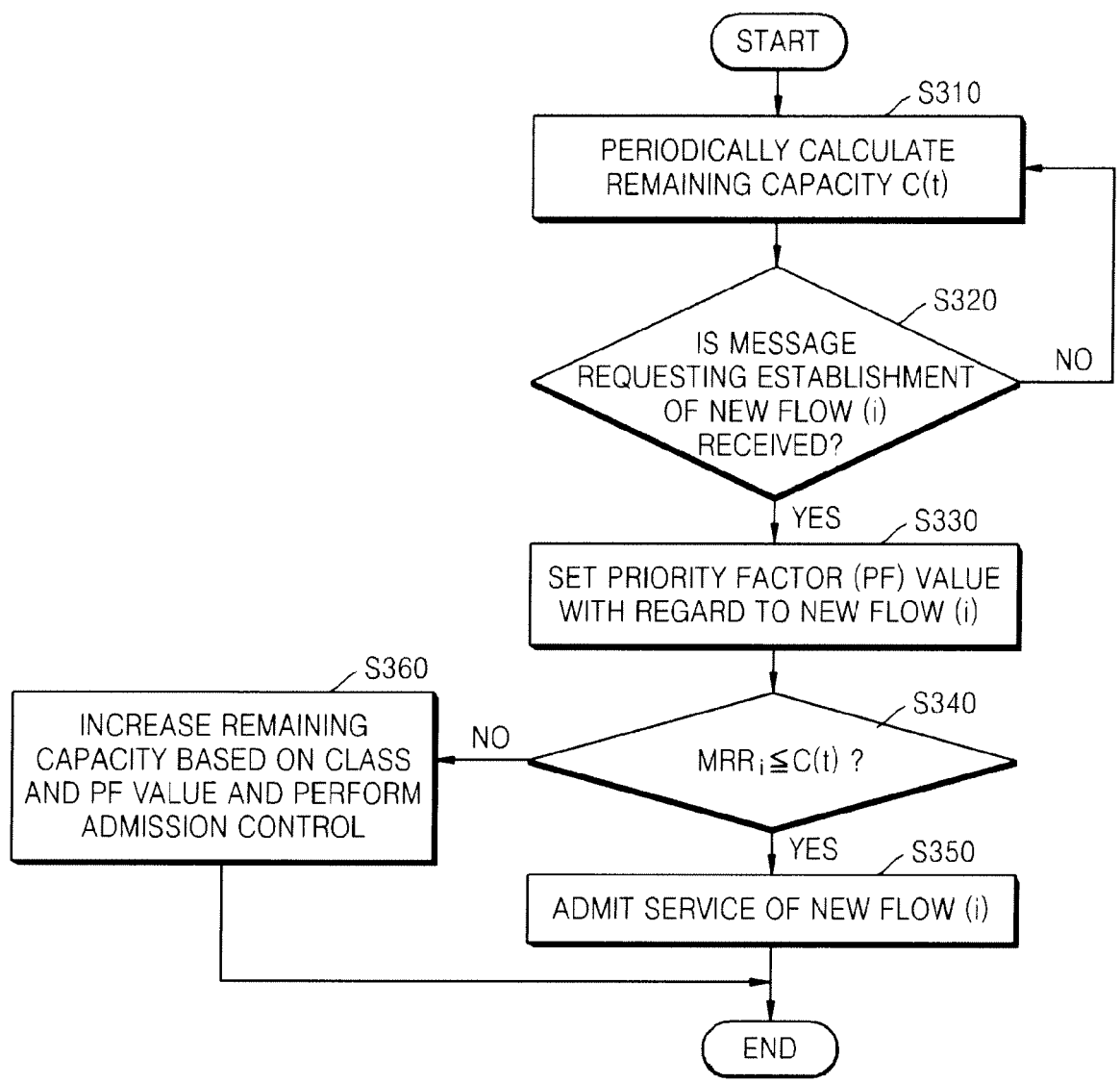
FIG. 3 is a flowchart illustrating a resource management method in a wireless communication system according to an embodiment.

FIG. 3 is a flowchart illustrating a resource management method in a wireless communication system according to an embodiment. Referring to FIG. 3, the controller 206 of the base station device periodically calculates the remaining capacity C(t) of the base station device (operation 310) according to equation 1 below.

$$C(t) = m_k * c_k * \text{subcarriers} \tag{1}$$

wherein, t denotes a current frame, $m_k$ denotes a robust modulation rate, and $c_k$ denotes a robust coding rate.

The memory 210 updates information on the remaining quantity C(t) calculated using equation 1.

The controller 206 determines if a message for requesting an establishment of a new link flow i is received from the message decoder 204 (operation 320). In more detail, the controller 206 determines if a dynamic service addition request (DSA-REQ) message is received from the message decoder 204.

If the message for requesting the establishment of the new flow i is received from the message decoder 204, the controller 206 inspects information (for example, a maximum sustained rate (MSR), a minimum reserved rate (MRR), latency, etc.) on a class of the new flow i and a specific flow, and sets a priority factor (PF) value with regard to the new flow based on a class to which a corresponding flow belongs (operation 330). The MSR indicates the capacity in condition of the lowest quality that can be most supported in order to receive a service with regard to a corresponding flow. The MRR indicates the minimum capacity supported by the base station device with regard to a corresponding flow service.

For example, if priority levels are divided into 0~10, class priority can be provided as follows.

UGS class flow: default value (9), boundary (min: 8 max: 10)

ertPS class flow: default value (7), boundary (min: 6 max: 8)

rtPS class flow: default value (5), boundary (min: 4 max: 6)

nrtPS class flow: default value (3), boundary (min: 2 max: 4)

BES class flow: default value (1), boundary (min: 0 max: 2)

When a subscriber terminal performs a handover, class priority is set in order of the highest priority of a class to which a flow belongs. For example, if a flow, establishment of which is requested, belongs to the rtPS class, a priority factor value of the flow is set as "6" which is the highest priority of the rtPS class.

Next, the controller 206 reads the remaining capacity C(t) stored in the memory 210 and compares the remaining capacity C(t) with an MRR value $MRR_1$ of the new flow i (operation 340).

If the MRR value $MRR_1$ of the new flow i does not exceed the remaining capacity C(t), the establishment of the new flow i is admitted (operation 350). In more detail, the base station device admits a service for the new flow i requested by the user terminal.

However, if the MRR value $MRR_1$ of the new flow i exceeds the remaining capacity C(t), the base station device does not admit the requested service for the new flow i due to insufficient remaining capacity of the base station device. In this case, the admission control process is performed while the remaining capacity C(t) of the base station device is increased based on the class and priority factor value according to the present embodiment (operation 360).

Figure 4:
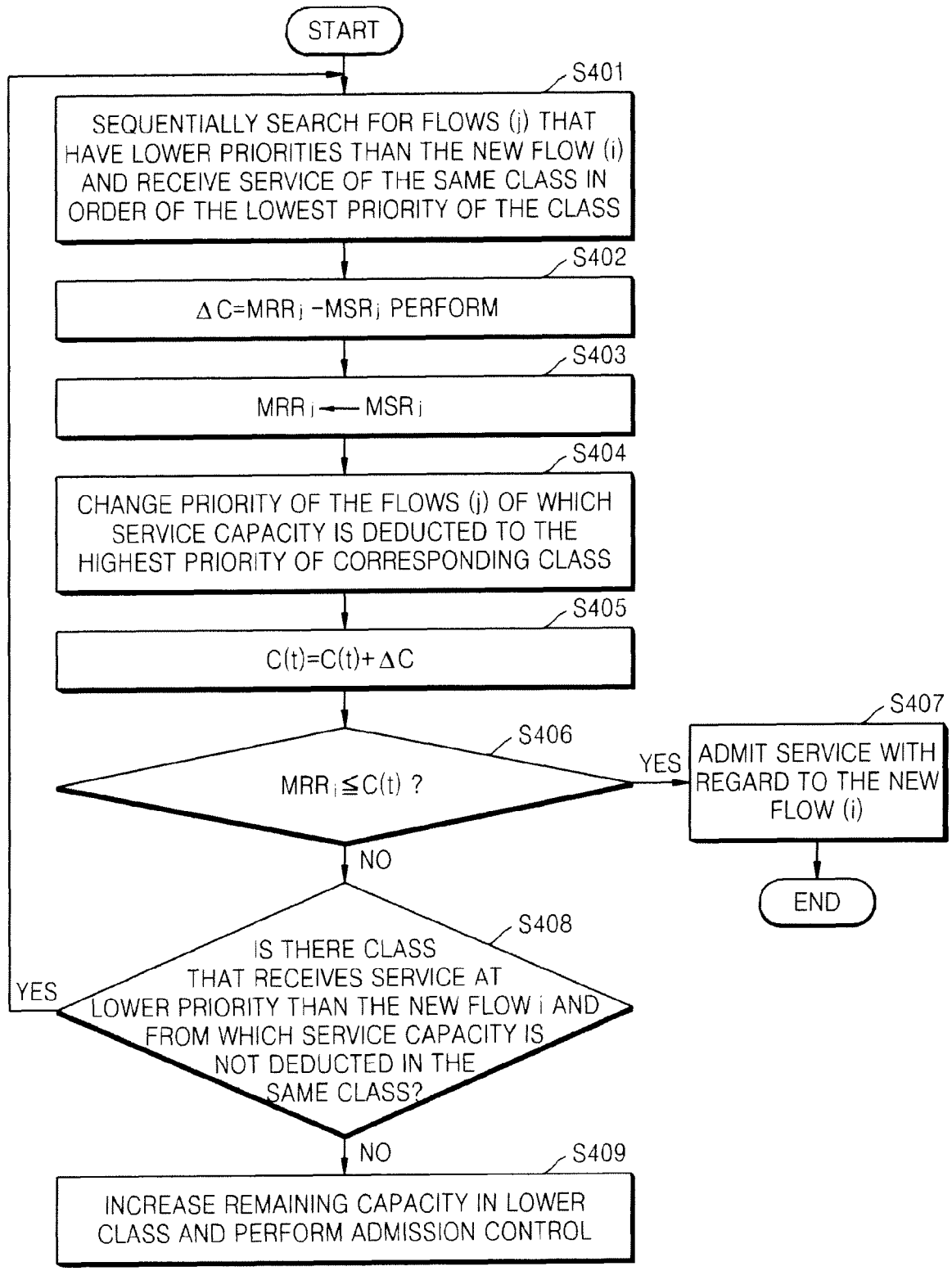
FIG. 4 is a flowchart illustrating an operation of the resource management method shown in FIG. 3.

FIG. 4 is a flowchart illustrating operation 360 shown in FIG. 3. Referring to FIG. 4, operation 360 of performing the admission control process and increasing the remaining capacity C(t) based on the priority of flows of the base station device will now be described in detail.

The controller 206 sequentially searches for flows j that have lower priorities than the new flow i in the class to which the new flow i belongs when the new flow i does not receive a service due to the insufficient remaining capacity of the base station device (operation 401).

An operation is performed according to equation 2 below in order to calculate a remaining capacity increase ΔC of the base station that occurs when an MRR value $MRR_j$ with regard to the sequentially found flows j is reduced to an MSR value $MSR_j$ (operation 402), $$\Delta C = MRR_j - MSR_j \tag{2}$$

wherein, $MRR_j$ and $MSR_j$ are minimum reserved rate value and maximum sustained rate value, respectively, with regard to the sequentially found flows j.

Thereafter, the MRR value $MRR_j$ of flows j used for the operation of equation 2 is reduced to the MSR value $MSR_j$ (operation 403). That is, service quality that is a bandwidth allocated in a base station for flows j is deducted by ΔC in equation 2.

A priority of the flows j, service capacity of which is deducted, is changed to the highest priority of a corresponding class (operation 404). For example, if the flows j, the service capacity of which is deducted, belong to the rtPS class and the priority of flows j is set to "5" before the service capacity is deducted, the priority of the flows j is changed to "6" which is the highest priority of the rtPS class. Such a priority change is to compensate QoS of the flows j of which service capacity is deducted.

The remaining capacity C(t) reflecting the remaining capacity increase ΔC is newly calculated by adding the remaining capacity increase ΔC to the remaining capacity C(t) stored in the memory 210 according to equation 3 below (operation 405).

$$C(t) = C(t) + \Delta C \tag{3}$$

The newly calculated remaining capacity C(t) is compared to the MRR value MRRi of the new flow i, establishment of which is requested (operation 406).

If the MRR value MRRi of the new flow i, establishment of which is requested, does not exceed the newly calculated remaining capacity C(t) reflecting the remaining quantity increase ΔC, the base station device admits the establishment of the new flow i (operation 407). In more detail, the base station device admits the service for the new flow i requested by the user terminal.

However, if the MRR value MRRi of the new flow i, establishment of which is requested, exceeds the newly calculated remaining capacity C(t) reflecting the remaining capacity increase ΔC, it is determined whether a class to which the new flow i belongs, the establishment of which is requested, includes a flow that receives a service at a lower priority than the flow i and from which service capacity is not deducted (operation 408). In more detail, it is determined if there is a flow that does not reduce an MRR value to an MSR value among flows that receive a service at a lower priority than the flow i in the class to which the new flow i belongs, establishment of which is requested.

If there is the flow that does not reduce the MRR value to the MSR value among flows that receive the service at a lower priority than the flow i in the class to which the new flow i belongs, establishment of which is requested, the process returns to operation 401.

Therefore, the remaining capacity of the base station device is increased by reducing an MRR value of a flow to an MSR value in order of the lowest priority among flows that receive a service at a lower priority than the new flow i, establishment of which is requested, in a class to which the new flow i belongs and that do not reduce the MRR value to the MSR value, until the remaining capacity required by a flow, establishment of which is requested, is generated.

If there is no flow to reduce the MRR value to the MSR value among flows that receive the service at a lower than the flow i in the class to which the new flow i belongs, of which establishment is requested, the service capacity is deducted from flows that receive a service in a lower class than that of the new flow i, establishment of which is requested, the remaining quantity of the base station device is increased, and the admission control process is performed (operation 409). In this case, the new flow i, establishment of which is requested, cannot be admitted even according to the remaining capacity of the base station device that is increased by the deduction of the service capacity of flows that receive a service in the class to which the new flow i belongs, establishment of which is requested. Thus, it is necessary to perform the acceptance control process by increasing the remaining capacity of the base station device by the deduction of the service capacity of flows that receive a service in a lower class than that of the new flow i of which establishment is requested.

Figure 5:
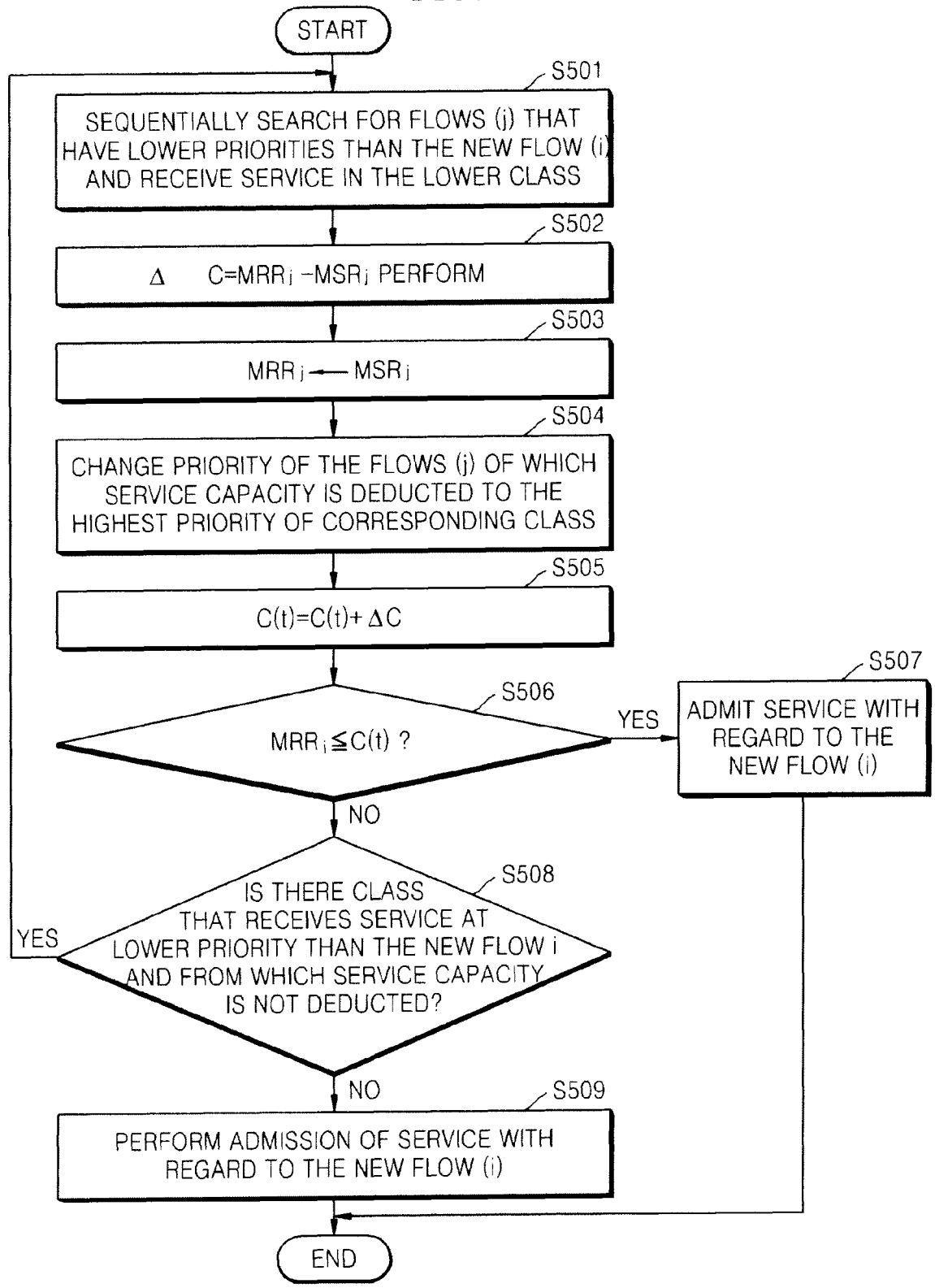
FIG. 5 is a flowchart illustrating an operation included in the operation shown in FIG. 4.

In operation 360, if the controller 206 determines that the new flow i, establishment of which is requested, belongs to the UGS class, the controller 206 does not perform operation 360 show in FIG. 4 but performs operation 409 shown in FIG. 5. Since an MRR value is the same as an MSR in the UGS class, the remaining capacity of the base station device does not increase according to operation 360 shown in FIG. 4.

FIG. 5 is a flowchart illustrating operation 409 shown in FIG. 4. Referring to FIG. 5, operation 409 of increasing the remaining capacity of the base station device in a lower class than that of the new flow i, establishment of which is requested, and performing the acceptance control process will now be described in detail.

The controller 206 sequentially searches for flows j that have lower priorities than the new flow i and receive a service of the same class as the new flow i, establishment of which is requested, in the order of the lowest priority of the class when the new flow does not receive a service due to the insufficient remaining capacity of the base station device (operation 501).

An operation is performed according to equation 2 in order to calculate a remaining capacity increase $\Delta C$ of the base station that occurs when an MRR value $MRR_j$ with regard to the sequentially found flows j is reduced to an MSR value $MSR_j$ (operation 502), Thereafter, the MRR value $MRR_j$ of flows j used for the operation according to equation 2 is reduced to the MSR value $MSR_j$ in order to increase the remaining capacity (operation 503).

A priority of the flows j of which service capacity is deducted is changed to the highest priority of a corresponding class (operation 504). For example, if the flows j, service capacity of which is deducted, belong to the BE class and the priority of flows j is set to "1" before the service capacity is deducted, the priority of the flows j is changed to "2" that is the highest priority of the BE class. Such a priority change is to compensate QoS of the flows j, service capacity of which is deducted.

The remaining quantity C(t) reflecting the remaining capacity increase $\Delta C$ is newly calculated by adding the remaining capacity increase $\Delta C$ to the remaining capacity C(t) stored in the memory 210 according to equation 3 (operation 505).

The newly calculated remaining capacity C(t) is compared to the MRR value MRRi of the new flow i, establishment of which is requested (operation 506).

If the MRR value MRRi of the new flow i, establishment of which is requested, does not exceed the newly calculated remaining capacity C(t) reflecting the remaining capacity increase $\Delta C$, the base station device admits the establishment of the new flow i (operation 507). In more detail, the base station device accepts the service for the new flow i requested by the user terminal.

However, if the MRR value MRRi of the new flow i, establishment of which is requested, exceeds the newly calculated remaining capacity C(t) reflecting the remaining capacity increase $\Delta C$, it is determined whether there is a flow that receives a service at a lower priority than the new flow I, establishment of which is requested and from which service capacity is not deducted irrespective of a class (operation 508). In more detail, it is determined if there is a flow that does not reduce an MRR value to an MSR value among flows that receive a service at a lower priority than the new flow i, establishment of which is requested.

If there is the flow that does not reduce an MRR value to an MSR value among flows that receive a service at a lower priority than the new flow i, establishment of which is requested, the process returns to operation 501.

Therefore, the remaining capacity of the base station device is increased by reducing an MRR value of a flow to an MSR value in the order of lowest priority among flows that receive a service at a lower priority than the new flow i of which establishment is requested and that do not reduce the MRR value to the MSR value, until the remaining quantity required by a flow, establishment of which is requested, is generated.

If there is no flow that does not reduce an MRR value to an MSR value among flows that receive a service at a lower priority than the new flow i, establishment of which is requested, an admission of the service of the new flow i, establishment of which is requested, is rejected (operation 509). In this case, after a rejection of the service of the new flow i, establishment of which is requested, is set, a DSA-RSP message indicating the rejection of the service of the new flow i, establishment of which is requested, is sent to the user terminal.

Although shown in FIGS. 3 through 5, when a flow initialization process of allowing the service of the new flow i, establishment of which is requested, is successful, a priority of the flow, service of which is allowed, is reduced to a default value of a corresponding class.

In more detail, when the user terminal performs a handover, a priority factor value is set according to a class to which a flow belongs and a priority is changed as described below when the flow initialization process is successful.

UGS class: a priority default value of a flow is updated to 10, a flow initialization is requested, and the priority default value is reduced to 9 after the flow initialization is successfully negotiated.

ertPS class: a priority default value of a flow is updated to 8, a flow initialization is requested, and the priority default value is reduced to 7 after the flow initialization is successfully negotiated.

rtPS class: a priority default value of a flow is updated to 6, a flow initialization is requested, and the priority default value is reduced to 5 after the flow initialization is successfully negotiated.

nrtPS class: a priority default value of a flow is updated to 4, a flow initialization is requested, and the priority default value is reduced to 3 after the flow initialization is successfully negotiated.

BE class: a priority default value of a flow is updated to 2, a flow initialization is requested, and the priority default value is reduced to 1 after the flow initialization is successfully negotiated.

A priority factor value of each class is allocated, and an admission control is efficiently performed in the 802.16/WiBro system based on a priority set to a new flow of which establishment is requested according to a policy of each class.

FIG. 6 illustrates a pseudo code used to perform the admission control according to the flowcharts illustrated in FIGS. 3 through 5. Referring to FIG. 6, the pseudo code includes the core processes shown in FIGS. 3 through 5 for descriptive convenience.

As described above, the disclosed embodiments allocate a priority factor value to each flow, controls service capacity of flows being served based on the priority factor value, and performs an admission control for a flow initialization, thereby enhancing system performance with limited resources of a base station device.

While the disclosed embodiments have been particularly shown and described with reference to exemplary embodiments thereof, it will be understood by those of ordinary skill in the art that various changes in form and details may be made therein without departing from the spirit and scope of the disclosed embodiments as defined by the appended claims. The exemplary embodiments should be considered in a descriptive sense only and not for purposes of limitation. Therefore, the scope of the disclosed embodiments is defined not by the detailed description of the embodiments but by the appended claims, and all differences within the scope will be construed as being included in the disclosed embodiments.

What is claimed is:

1. A resource management method in a wireless management network, the method comprising:
    setting a priority factor value with regard to a link flow for which link establishment is requested; and
    if a capacity required by the flow for which link establishment is requested exceeds a remaining capacity of a base station, increasing the remaining capacity of the base station by sequentially reducing a minimum reserved rate (MRR) value of flows that receive a service at a lower priority than the flow for which link establishment is requested to a maximum sustained rate (MSR) value, until the remaining capacity required by the flow for which link establishment is requested is generated,
    wherein the increasing of the remaining capacity comprises: performing a first operation of sequentially reducing an MRR value of flows that receive a service at a lower priority than the flow for which link establishment is requested to an MSR value in the class to which the flow for which link establishment is requested belongs, until the remaining capacity is generated so as to admit the flow for which link establishment is requested, and
    wherein the increasing of the remaining quantity comprises: if the class to which requested link establishment belongs is an unsolicited grant service (UGS) class, skipping the first operation and performing a second operation of sequentially reducing an MRR value of flows that receive a service at a lower priority than the flow for which link establishment is requested to an MSR value in a class other than the UGS class, until the remaining capacity is generated so as to admit the flow for which link establishment is requested.

2. The method of claim 1, wherein the priority factor value is determined according to a class to which a corresponding flow belongs.

3. The method of claim 1, wherein the priority factor value is determined according to classes, and a plurality of priorities are allocated to the same class.

4. The method of claim 1, wherein the priority factor value is determined in an order of an unsolicited grant service (UGS) class, an enhanced-real-time polling service (ertPS) class, a real-time polling service (rtPS) class, a non-real-time polling service (nrtPS) class, and a best effort service (BE) class.

5. The method of claim 1, wherein the priority with regard to the flow for which link establishment is requested is initially determined in an order of the highest priority in a class to which the flow belongs.

6. The method of claim 1, further comprising: if the flow for which link establishment is requested is successfully initialized, changing the priority of the flows that have been successfully initialized to an initially set priority of a corresponding class.

7. The method of claim 1, wherein the increasing of the remaining capacity comprises: if capacity required by the flow for which link establishment is requested exceeds the remaining capacity after performing the first operation, performing a third operation of sequentially reducing an MRR value of flows that receive a service at a lower priority than the flow for which link establishment is requested to an MSR value irrespective of a class, until the remaining capacity is generated so as to admit the flow for which link establishment is requested.

8. The method of claim 7, further comprising: if the capacity required by the flow for which link establishment is requested exceeds the remaining capacity after performing the third operation, rejecting an admission of a service with regard to a corresponding flow.

9. The method of claim 1, wherein the increasing of the remaining capacity further comprises: changing the priority of the flows, the MRR value of which is reduced to the MSR value, to the highest priority of a class to which a corresponding flow belongs.

10. A non-transitory computer readable recording medium having recorded thereon a program for executing the method of claim 1.

* * * * *